(12) United States Patent
Verhoog et al.

(10) Patent No.: US 9,568,049 B2
(45) Date of Patent: Feb. 14, 2017

(54) TORQUE TRANSMISSION DEVICE FOR A MOTOR VEHICLE

(71) Applicant: VALEO EMBRAYAGES, Amiens (FR)

(72) Inventors: Roel Verhoog, Gournay sur Aronde (FR); Michael Hennebelle, Houdain (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/385,556

(22) PCT Filed: Mar. 19, 2013

(86) PCT No.: PCT/FR2013/050578
§ 371 (c)(1),
(2) Date: Sep. 16, 2014

(87) PCT Pub. No.: WO2013/140082
PCT Pub. Date: Sep. 26, 2013

(65) Prior Publication Data
US 2015/0087429 A1 Mar. 26, 2015

(30) Foreign Application Priority Data
Mar. 20, 2012 (FR) ..................... 12 52470

(51) Int. Cl.
*F16F 15/121* (2006.01)
*F16D 3/12* (2006.01)
(Continued)

(52) U.S. Cl.
CPC . *F16D 3/12* (2013.01); *F16D 3/64* (2013.01); *F16F 15/1217* (2013.01); *F16F 15/12373* (2013.01); *F16H 2045/0231* (2013.01)

(58) Field of Classification Search
CPC .......... F16D 3/12; F16D 3/64; F16F 15/1217; F16F 15/12373; F16H 2045/0231
(Continued)

(56) References Cited

U.S. PATENT DOCUMENTS 4,548,311 A * 10/1985 Lech, Jr. ............. F16F 15/1202
192/213.22 X
RE33,984 E * 7/1992 Spitler ................ F16F 15/1234
(Continued)

FOREIGN PATENT DOCUMENTS

DE 102009052202 6/2010
FR 2928432 9/2009
GB 2189867 11/1987

*Primary Examiner* — Gregory Binda
(74) *Attorney, Agent, or Firm* — Berenato & White, LLC

(57) ABSTRACT

A torque transmission device for a motor vehicle, having a torque input element (7a), a torque output element (24), and at least one group of elastic members (10a, 10b) mounted between the torque input element (7a, 7b) and the torque output element (24) and arranged in series by means of a phasing member (30). The torque output element (24) and the phasing member (30) have first (28a, 33a) and second stop means (28b, 33b) limiting their relative rotation in two opposite rotation directions (D, R), the torque input element (7a, 7b) and the phasing member (30) having third (34, 17b) and fourth stop means (34, 16b) limiting their relative rotation in two opposite rotation directions (D, R). Additionally, the torque input (7a, 7b) and output elements (24) have fifth (29, 16a) and sixth stop means (29, 17a) limiting their relative rotation in two opposite rotation directions (D, R).

9 Claims, 15 Drawing Sheets

(51) Int. Cl.
*F16F 15/123* (2006.01)
*F16D 3/64* (2006.01)
*F16H 45/02* (2006.01)

(58) Field of Classification Search
USPC .......... 464/68.1, 68.8, 68.9; 192/213–213.22
See application file for complete search history.

(56) References Cited

U.S. PATENT DOCUMENTS 8,047,922 B2 11/2011 Maienschein
2007/0051577 A1 3/2007 Avins et al.

* cited by examiner

TORQUE TRANSMISSION DEVICE FOR A MOTOR VEHICLE

CROSS-REFERENCE TO RELATED APPLICATIONS AND CLAIM TO PRIORITY

This application is a national stage application of International Application No. PCT/FR2013/050578 filed Mar. 19, 2013, which claims priority to French Patent Application No. 1252470 filed Mar. 20, 2012, of which the disclosures are incorporated herein by reference and to which priority is claimed.

FIELD OF THE INVENTION

The present invention relates to a torque transmission device for a motor vehicle.

BACKGROUND OF THE INVENTION

A device of this kind has in general a torque input element, a torque output element, and elastic members mounted between the torque input element and the torque output element and acting oppositely to the rotation of the torque input element and the torque output element with respect to one another.

When the torque transmission device is of the long travel damper (LTD) type, it comprises several groups of elastic members, the elastic members of a single group being arranged in series by means of a phasing member, so that the elastic members of each group deform in phase with one another.

Conventionally, the torque input element and the torque output element have first and second stop means limiting their relative rotation in two opposite rotation directions, the torque input element and phasing member having third and fourth stop means limiting their relative rotation in two opposite rotation directions.

In this configuration, no means is provided for limiting the angular travel of the phasing member with respect to annular web elements that, for example, makes up the respective torque input and output elements.

In order to improve damping and to absorb vibrations and rotational irregularities of the engine, provision can be made to mount pendulum masses on the phasing member. In this instance said member can exhibit a very large inertia, so that in operation it can completely compress the elastic members in both the "forward" rotation direction and in the opposite, "reverse" rotation direction. The forward direction corresponds to the operating instance in which torque is transmitted from the torque input element to the torque output element. In certain operating phases, for example when the user abruptly lifts his or her foot off the accelerator, a resistance torque is transmitted from the torque output element to the torque input element, which can cause the phasing member to rotate in the reverse direction.

When the elastic members are helical compression springs, excessive compression of said springs can bring the turns into contact with one another. The turns are then said to be "contiguous." If the torque being transmitted is high, the turns experience crushing, causing fatigue and premature wear on the springs.

In general, it is necessary to be able to limit angular deflections among all the movable elements of the torque transmission device, which is not achieved in the existing art.

The document U.S. Pat. No. 8,047,922 discloses a torsion damper having torque input elements and torque output elements between which are arranged several groups of elastic members arranged in series by means of a phasing member. Stops are provided between the torque input element on the one hand and the phasing member or annular web on the other hand.

A damper of this kind has a relatively complex structure and does not allow the aforementioned problems—of controlling deflection and/or of damage to the springs—to be solved.

SUMMARY OF THE INVENTION

The object of the invention is in particular to provide a simple, efficient, and economical solution to this problem.

It proposes for this purpose a torque transmission device for a motor vehicle, having a torque input element, a torque output element, and at least one group of elastic members mounted between the torque input element and the torque output element and acting against the rotation of the torque input element and the torque output element with respect to one another, the elastic elements of said group being arranged in series by means of a phasing member so that the elastic members of each group deform in phase with one another, the torque output element and the phasing member having first and second stop means limiting their relative rotation in two opposite rotation directions, the torque input element and the phasing member having third and fourth stop means limiting their relative rotation in two opposite rotation directions, wherein the torque input element and the torque output element have fifth and sixth stop means limiting their relative rotation in two opposite rotation directions.

According to the invention the device thus has three pairs of stops, i.e. three stops for each rotation direction (reverse direction and forward direction), in order to limit rotation of the torque input element with respect to the torque output element, rotation of the input element with respect to the phasing member, and relative rotation of the output element with respect to the phasing member. Angular deflections among all the movable elements of the torque transmission device are thus limited.

It is possible to control the angular deflection of each of said elements depending on the positions of the various stops, in particular in order to limit compression of the elastic members mounted between the torque input element and the phasing member on the one hand, and between the phasing member and the torque output element on the other hand.

Preferably the elastic members are helical compression springs, and the stop means are designed to limit compression of the springs and to prevent the turns of the springs from coming into abutment against one another.

The helical springs are thereby prevented from experiencing damage due to crushing of their turns.

According to a characteristic of the invention, the elastic members of the group or of each group come into abutment on the one hand against an annular web forming respectively the torque output element or the torque input element, and on the other hand against two guide washers that extend radially on either side of the annular web and are movable rotationally with respect to the latter, the guide washers forming respectively the torque input element or the torque output element.

According to another characteristic of the invention, the annular web has N stop means, the phasing member has N stop means, and at least one of the guide washers has 2N projecting elements intended to interact during operation with the N stop means of the annular web and of the phasing member, each projecting element having two opposite stop faces, the projecting elements being distributed over the circumference of the guide washer in two groups, the stop means of the annular web being able to come into abutment against first faces of the projecting elements of a first group in a first rotation direction, and to come into abutment against first faces of the projecting elements of a second group in a second, opposite rotation direction, the stop means of the phasing member being able to come into abutment against second faces of the projecting elements of the second group in a first rotation direction, and to come into abutment against second faces of the projecting elements of the first group in a second, opposite rotation direction.

Each projecting element thus has two stop functions, which considerably simplifies the structure of the torque transmission device.

Advantageously, the annular web has a radially inner annular part from which abutment tabs of the elastic members extend radially outward.

The aforesaid annular web allows the springs to be placed on a circumference of larger diameter as compared with an annular web having mounting windows for the elastic members. Filtering of the vibrations and rotational irregularities of the engine is thus improved.

The annular web and the phasing member can each have regions extending radially and serving for abutment of the elastic members, stop blocks extending circumferentially on either side of each of said regions so that the stop blocks of the annular web are able to come into abutment against the stop blocks of the phasing member.

A structure of this kind allows the stop function between the phasing member and the annular web to be ensured in simple and reliable fashion in both rotation directions.

In addition, the stop means of the annular web and of the phasing member interacting with the projecting elements of the guide washer have blocks extending from the abutment regions of the elastic members, each block having two opposite stop faces able to come into abutment against the corresponding stop faces of the projecting elements of the two groups.

Preferably the torque transmission device has two guide washers fastened to one another by riveting and/or by welding at their radially outer periphery.

In this instance at least one of the guide washers can have, on its radially outer periphery, deformable lugs able to be bent onto the other guide washer so as to ensure fastening of the one to the other.

BRIEF DESCRIPTION OF THE DRAWINGS

The invention will be better understood, and other details, characteristics, and advantages of the invention will emerge, upon reading the description below provided as a non-limiting example referring to the attached drawings, in which.

DETAILED DESCRIPTION OF THE PREFERRED EMBODIMENT(S)

Figure 1:
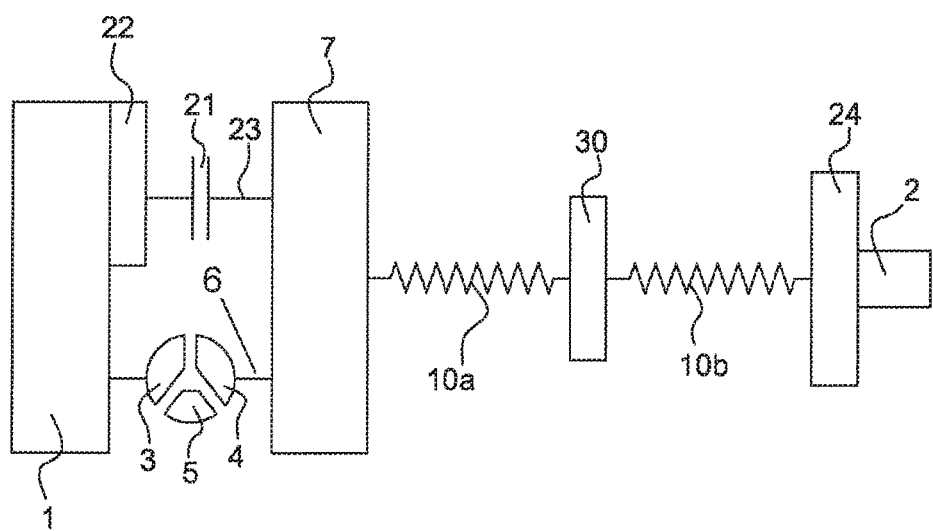
FIG. 1 is a schematic view of a torque transmission device according to the invention embodied as a hydrodynamic torque converter.

A hydrodynamic torque converter according to the invention is depicted schematically and partially in FIG. 1. This converter allows a torque to be transmitted from an output shaft of an internal combustion engine of a motor vehicle, for example a crankshaft 1, to an input shaft 2 of a gearbox.

The torque converter conventionally has a bladed impeller wheel 3 able to hydrokinetically drive a bladed turbine wheel 4 by means of a reactor 5.

Impeller wheel 3 is coupled to crankshaft 1, and turbine wheel 4 is coupled to a turbine hub 6 that in turn is coupled to two guide washers 7 hereinafter referred to respectively as front guide washer 7a and rear guide washer 7b A clutch 21 allows transmission of a torque from crankshaft 1 to guide washers 7 in a defined operating phase without involving impeller wheel 3 and turbine wheel 4. This clutch 21 has an input element 22 coupled to crankshaft 1 and an output element 23. The two guide guide washers 7, in turn, provide torque through series coupled elastic members 10a, 10b, through phasing member 30, to an annular web member 24. Torque is then passed to input shaft 2 of the gearbox.

Figure 2:
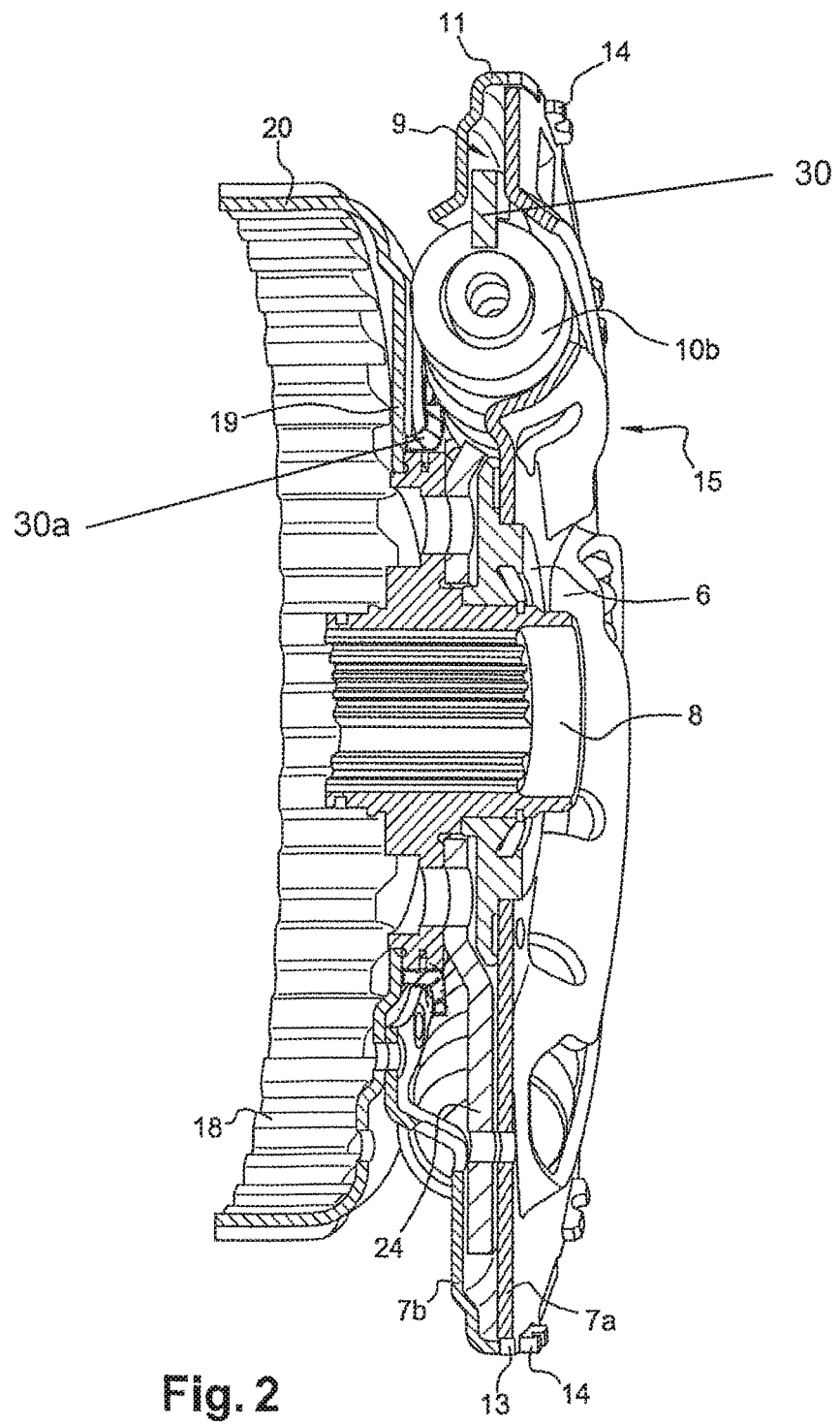
FIG. 2 is a view, in perspective and in longitudinal section, of a part of a torque transmission device according to the invention.
Figure 3:
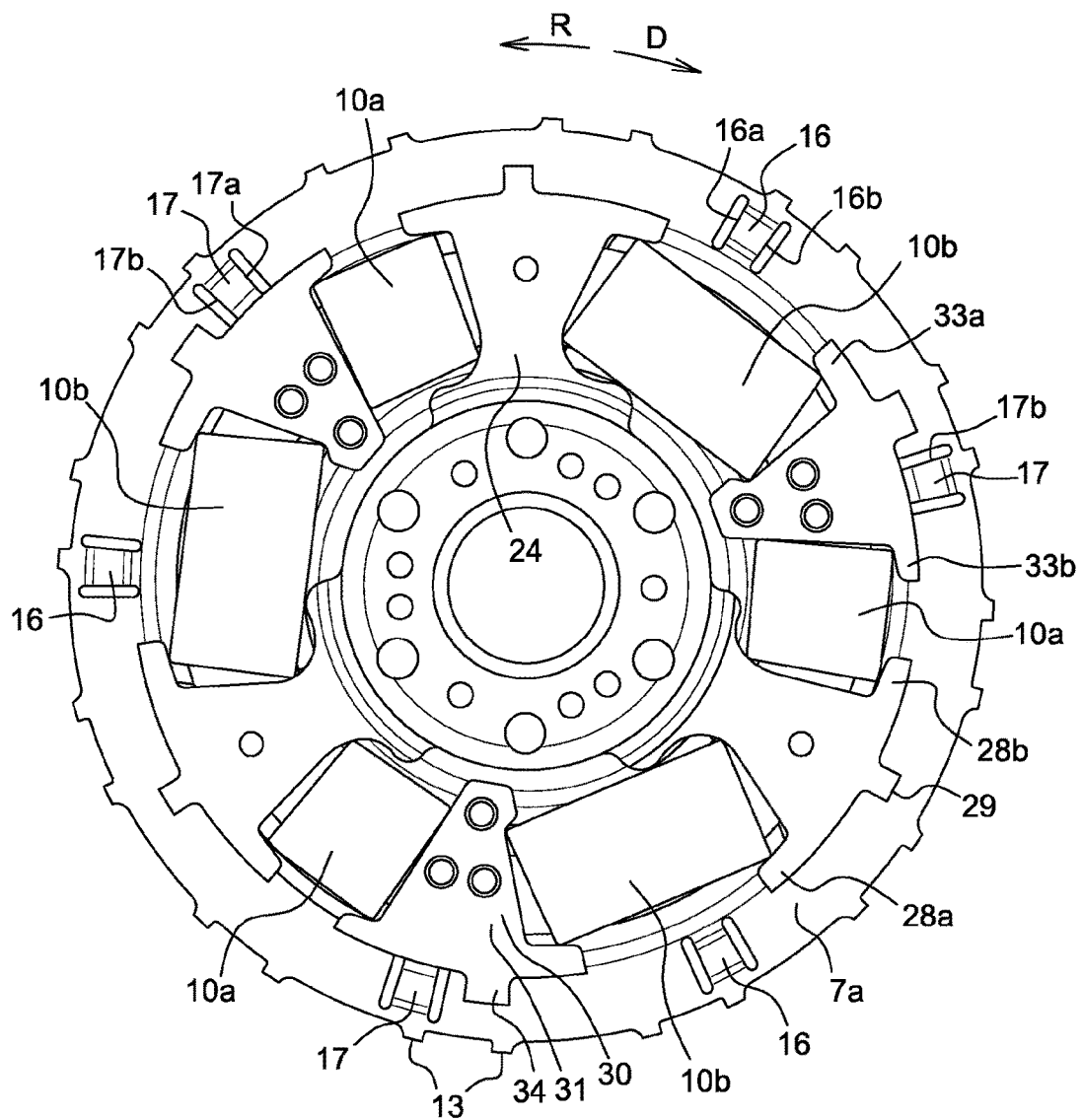
FIG. 3 is a frontal view of a part of the torque transmission device of FIG. 2.
Figure 4:
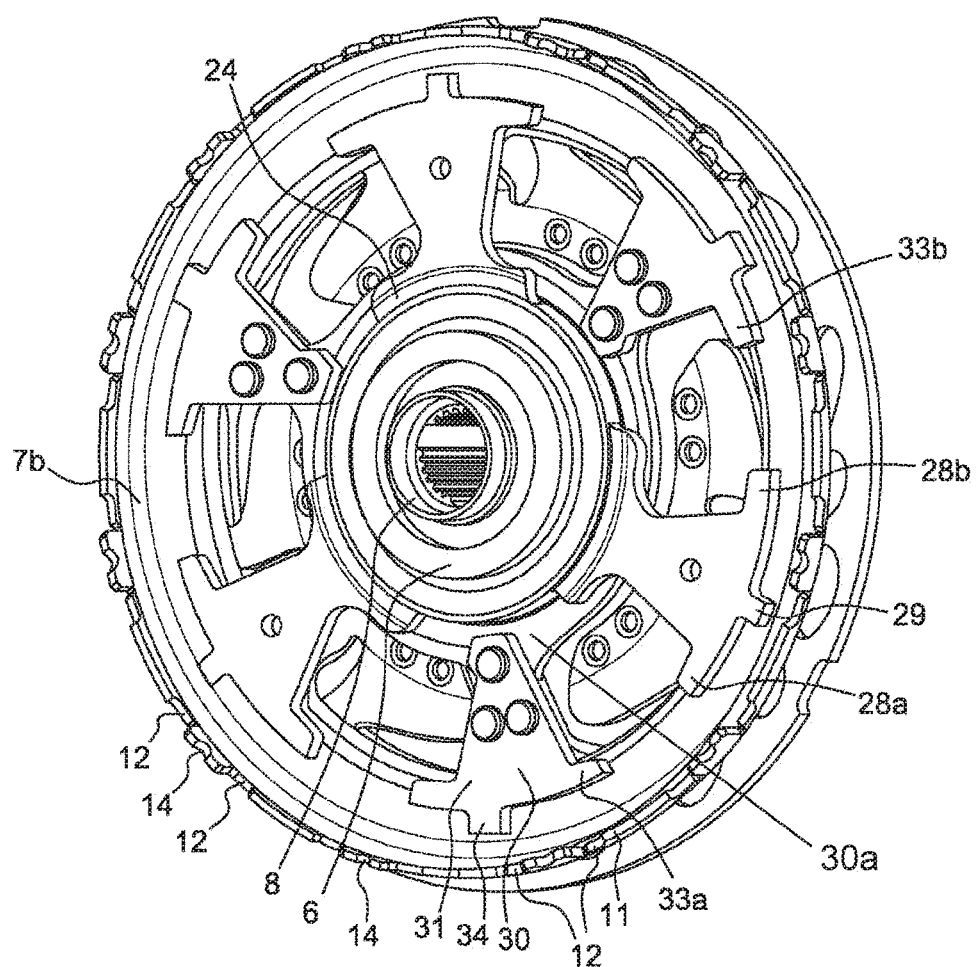
FIG. 4 is a perspective view of a part of the torque transmission device.

Referring now to FIGS. 2-4, for details of the stop elements that limit relative rotation, respectively, between the guide washers 7, phasing member 30, and annular member 24: Front guide washer 7a and turbine hub 6 are mounted rotatably around a splined central hub 8 intended to be coupled to input shaft 2 of the gearbox.

Front guide washer 7a is mounted around turbine hub 6 and fastened thereto. The two guide washers 7a, 7b extend radially and demarcate between them an inner space 9 housing elastic members 10a, 10b that are, for example, helical compression springs.

Rear guide washer 7b has a cylindrical rim 11 at its radially outer periphery, extending toward front guide washer 7a and fastened thereto.

The free end of cylindrical rim 11 has notches 12 (FIG. 4) serving to receive positioning and centering pegs 13 extending from the radially outer periphery of front guide washer 7a.

The free end of cylindrical rim 11 furthermore has tabs 14 that extend axially before the two guide washers 7a, 7b are fastened to one another. These tabs 14 are bent over onto the outer periphery of front guide washer 7a during a riveting operation, and can be welded to the latter in order to ensure fastening of the two guide washers 7a, 7b. Note that in the embodiment depicted in the Figures, each tab 14 is positioned circumferentially between two pegs 13.

Guide washers 7a, 7b conventionally have windows 15 serving to receive elastic members 10a, 10b.

At least one of guide washers 7a, 7b, here front guide washer 7a, has projecting elements 16, 17, for example six in number, present in the form of portions deformed by stamping in the direction of rear washer 7b. Each projecting element 16, 17 has two opposite stop faces labeled respectively 16a, 16b and 17a, 17b.

A splined hub 18 (FIG. 2) is also fastened onto the rear face of rear guide washer 7b. This splined hub 18 has a radial part 19 fastened onto said rear face of rear guide washer 7b, and a splined cylindrical rim 20 extending toward the rear from the radially outer periphery of radial part 19.

A clutch 21 (FIG. 1) allows transmission of a torque from crankshaft 1 to guide washers 7 in a defined operating phase without involving impeller wheel 3 and turbine wheel 4. This clutch 21 has an input element 22 coupled to crankshaft 1 and an output element 23 comprising splined hub 18.

A radially extending annular web 24 is mounted in the inner space and is fastened onto central hub 8 by means of rivets.

Figure 5:
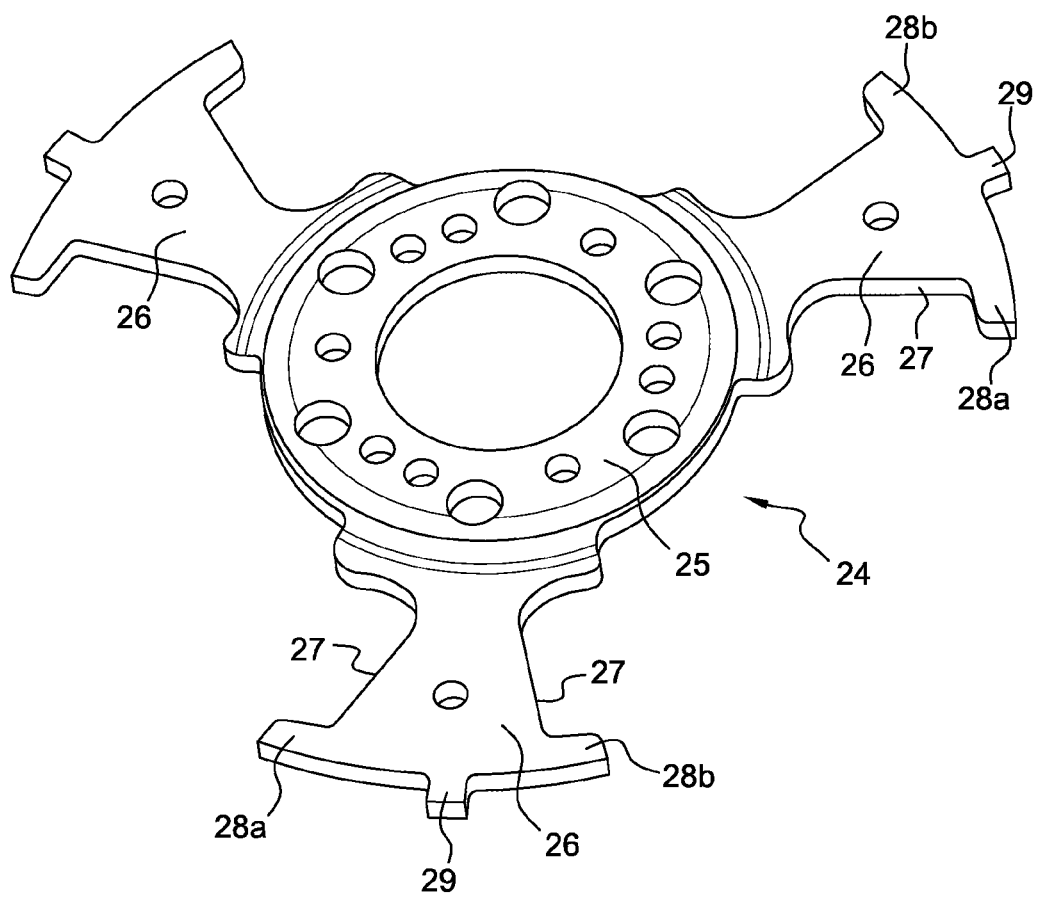
FIG. 5 is a perspective view of the annular web.

As is better apparent from FIG. 5, annular web 24 has a radially inner annular part 25 from which tabs 26, for example three in number, extend radially outward. Each tab 26 has two opposite faces 27 serving for abutment against elastic members 10a, 10b, which are inclined with respect to one another and with respect to the radial direction. Two stop blocks 28a, 28b extend circumferentially on either side of each tab 26 at its outer periphery. Each tab 26 furthermore has, at its outer periphery, a stop block 29 extending radially outward.

Elastic members 10a, 10b are mounted circumferentially between annular web 24 and guide washers 7a, 7b.

More particularly, elastic members 10a, 10b are arranged in pairs. The elastic members (FIG. 1) of a single pair are arranged in series by means of a common phasing member 30, so that elastic members 10a, 10b become deformed in phase with one another. In the embodiment depicted in the Figures, the torque converter has three pairs of elastic members 10a, 10b.

Thus for each pair of elastic members 10a, 10b, depending on the rotation direction of guide washers 7a, 7b with respect to annular web 24, one of the elastic members (e.g. 10a) is intended to come into abutment on the one hand against the corresponding end of windows 15 of guide washers 7a, 7b, and on the other hand against phasing member 30. The other elastic member (e.g. 10b) is then intended to come into abutment on the one hand against phasing member 30 and on the other hand against one of the faces 27 of the corresponding tab 26 of annular web 24.

FIG. 3 illustrates the instance in which springs 10a are partly compressed by the relative rotation of phasing member 30 and annular web 24. When inactive, elastic members 10a and 10b are of substantially the same length.

Figure 6:
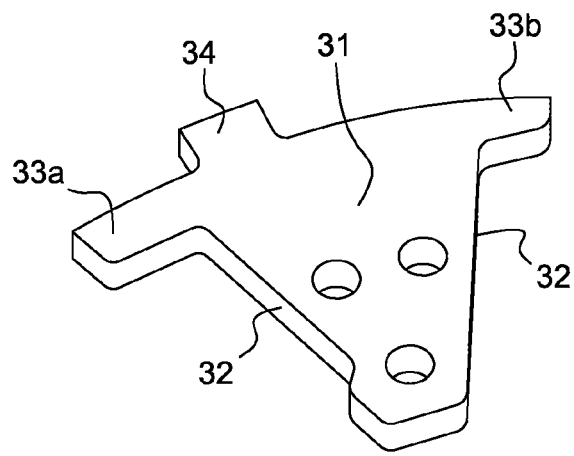
FIG. 6 is a perspective view of a part of the phasing member.
Figure 7:
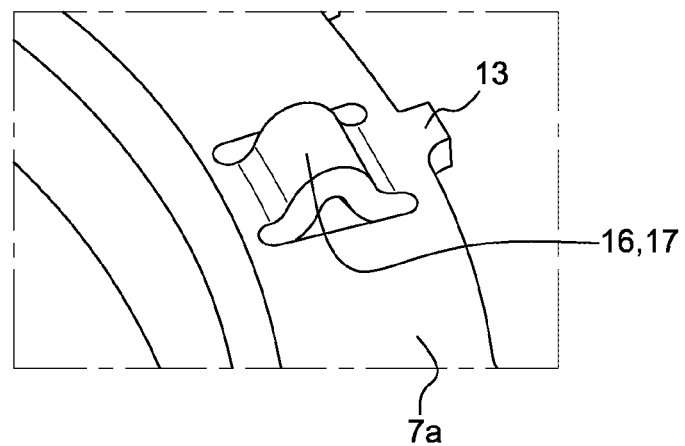
FIG. 7 is a perspective detail view illustrating two stops of a guide washer.

Phasing member 30 is visible only partly in FIG. 3, and has an annular part 30a (shown in FIG. 4) on which abutment members 31 (here three in number) are fastened by means of rivets. Each abutment member 31 has two opposite faces 32 (FIG. 6) serving for abutment of elastic members 10a, 10b that are inclined with respect to one another and with respect to the radial direction. Two stop blocks 33a, 33b (FIG. 6) extend circumferentially on either side of each abutment member at its outer periphery. Each abutment member 31 furthermore has at its outer periphery a stop block 34 extending radially outward.

Stop blocks 28a, 28b of tabs 26 of annular web 24 are able to come into abutment respectively against stop blocks 33a, 33b of abutment members 31 of phasing member 30.

Annular web 24 and phasing member 30 thus each have three blocks 28a, 28b, 29 and 33a, 33b, 34, and front guide washer 7a has six projecting elements 16, 17 intended to interact during operation with blocks 29, 34 of annular web 24 and of phasing member 30.

In an embodiment that is not depicted, phasing member 30 can furthermore have pendulum masses intended to improve the filtering of vibrations and rotational irregularities.

Projecting elements 16 can be distributed over the circumference of one of the two guide washers, projecting elements 17 then being distributed over the other of the guide washers.

In the preferred embodiment, projecting elements 16, 17 are distributed over the circumference of one of the two guide washers (or the front guide washer) in two groups, blocks 29 of annular web 24 being able to come into abutment against first faces 16a of projecting elements 16 of a first group in a first rotation direction (called the "forward" direction, depicted by arrow D), and against first faces 17a of projecting elements 17 of a second group in a second, opposite rotation direction (called the "reverse" direction, depicted by arrow R). Similarly, blocks 34 of phasing member 30 are able to come into abutment against second faces 17b of projecting elements 17 of the second group in a first rotation direction (forward direction), and against second faces 16b of projecting elements 16 of the first group in a second, opposite rotation direction (reverse direction). As such, the respective stop elements of the annular web (24) and of the phasing member (30) interact with the projecting elements (16, 17) of the guide washer (7a), to wit: blocks (29, 34), extending from the abutment regions (26, 31) of the elastic members (10a, 10b), each have two opposite stop faces able to come into abutment against the corresponding stop faces (16a, 16b, 17a, 17b) of the projecting elements (16, 17).

Blocks 28a, 28b, 29, 33a, 33b, 34 and projecting elements 16, 17 are positioned and dimensioned so as to limit the compression of elastic members 10a, 10b and, when the latter are helical springs, to prevent the turns of the springs from being contiguous when they are compressed regardless of the operating mode of the torque converter.

Figure 8:
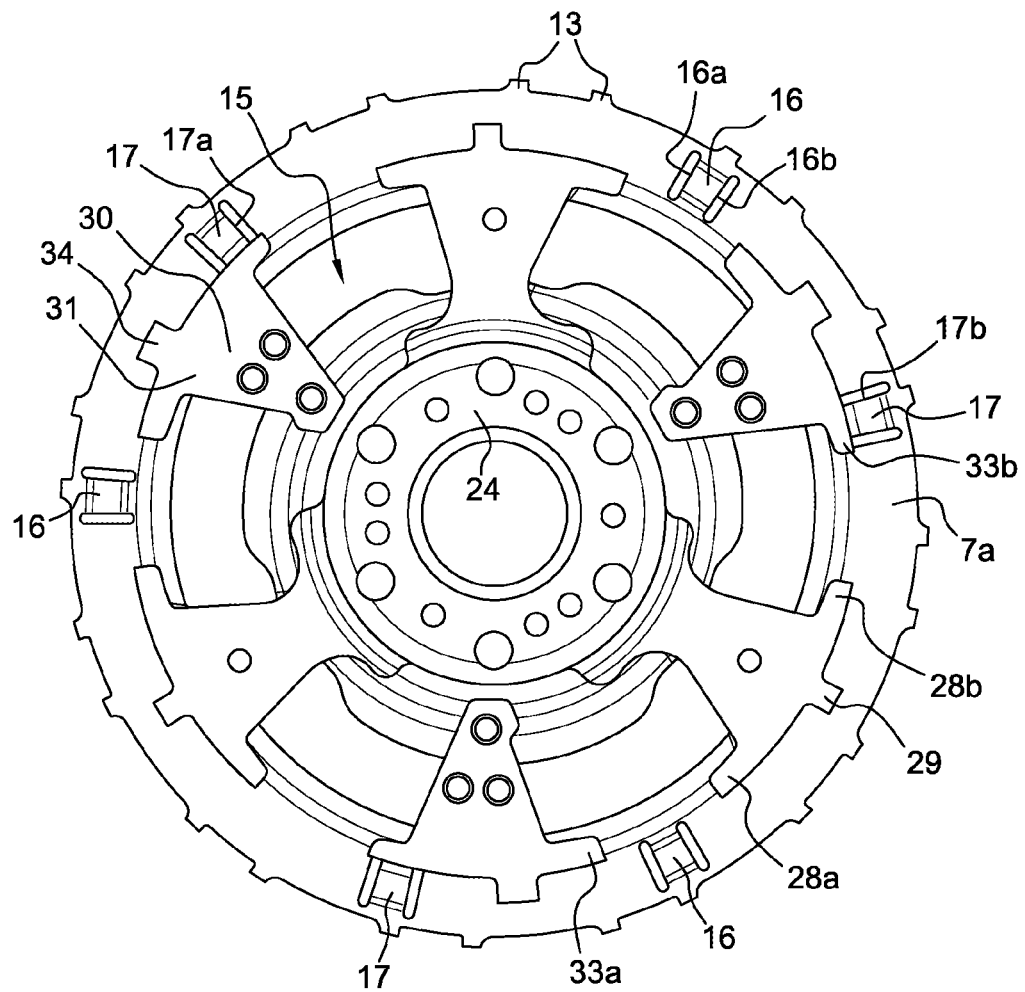
FIGS. 8 to 12 are frontal views of a part of the torque transmission device with the various movable elements in several angular positions.

FIG. 8 depicts the torque converter according to the invention in an inactive position in which blocks 28a, 28b and 33a, 33b are spaced away from one another and blocks 29, 34 are spaced away from projecting elements 16, 17. In this inactive position, elastic members 10a, 10b are subjected to minimal compression forces.

In a first operating instance, phasing member 30 pivots in the reverse direction from its inactive position. Deflection of the phasing member can then be limited by blocks 34 coming to a stop against faces 16b of projecting elements 16 (FIG. 9).

Figure 10:
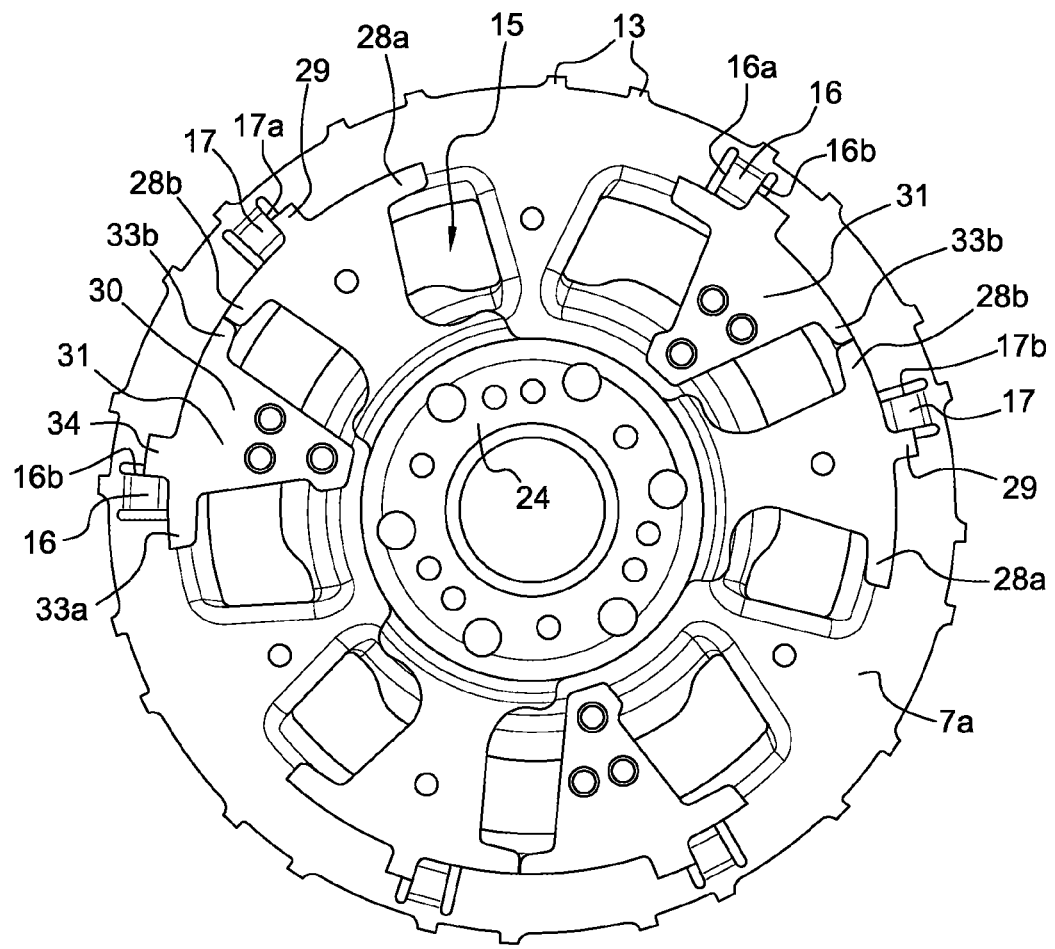

In a second operating instance illustrated in FIG. 10, phasing member 30 and annular web 24 can pivot with respect to one another into an extreme position in which blocks 28b, 33b of annular web 24 and of phasing member 30 come to a stop against one another. As indicated previously, said blocks 28b, 33b are dimensioned so as to limit the compression of elastic members 10a, 10b. In the instance depicted in FIG. 10 as well, blocks 29 and 34 can come to a stop respectively against faces 17a and 16b of projecting elements 17 and 16.

Figure 9:
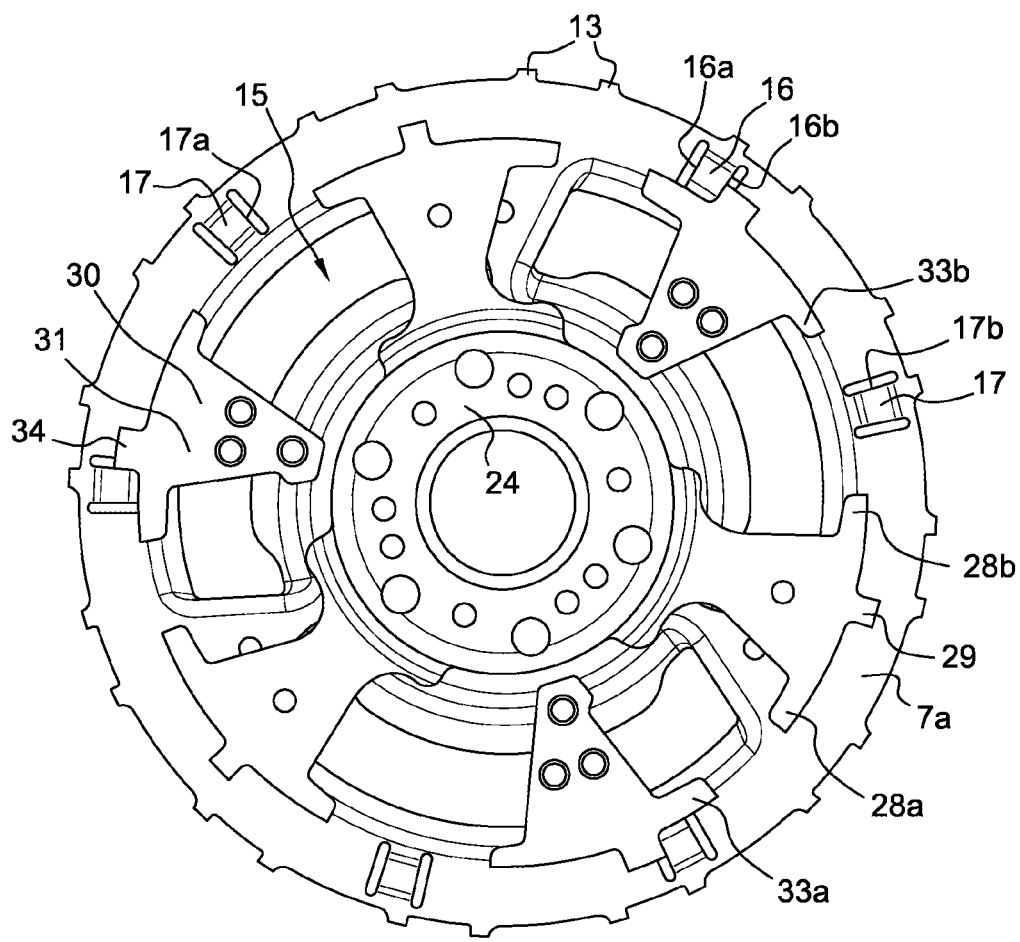
Figure 11:
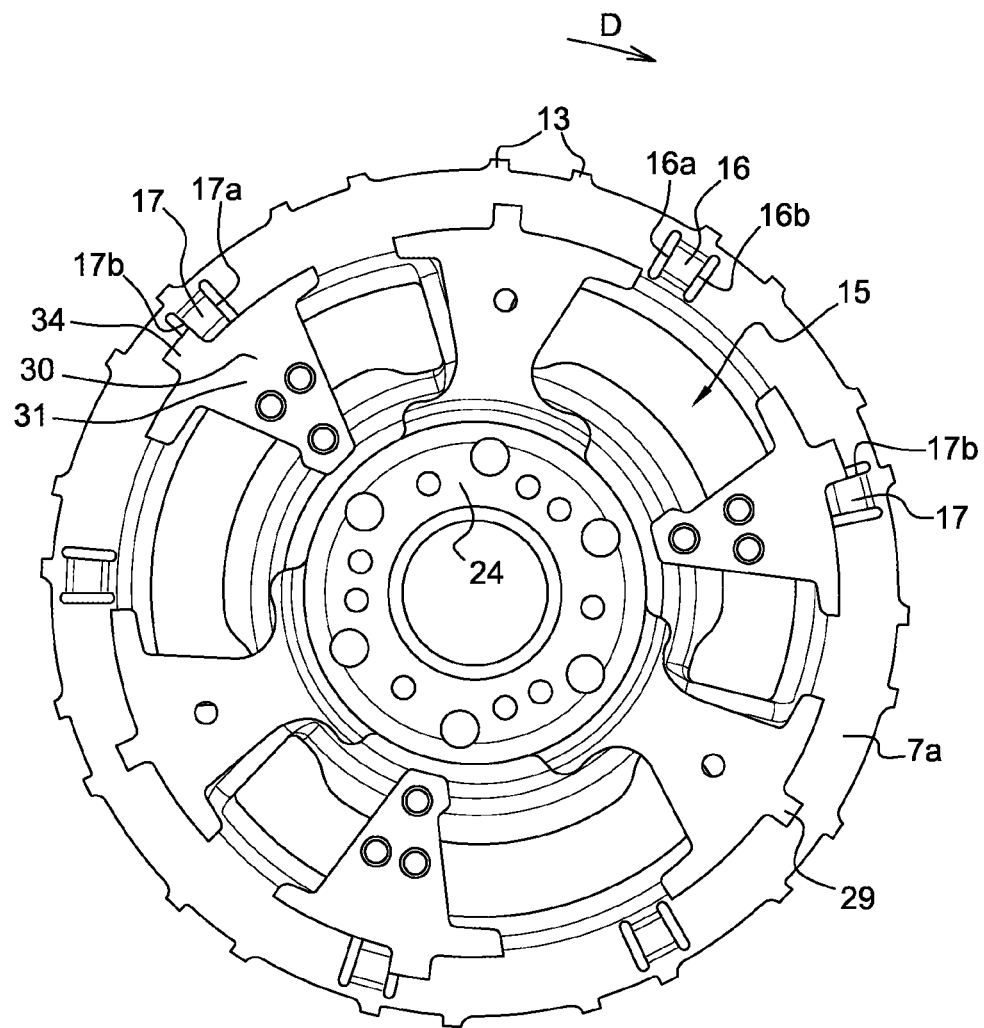

FIG. 11 illustrates a third operating instance in which phasing member 30 has pivoted in the forward direction (arrow D) from its inactive position illustrated in FIG. 9, said pivoting being limited by the fact that blocks 34 come to a stop against abutment faces 17b of projecting elements 17.

Figure 12:
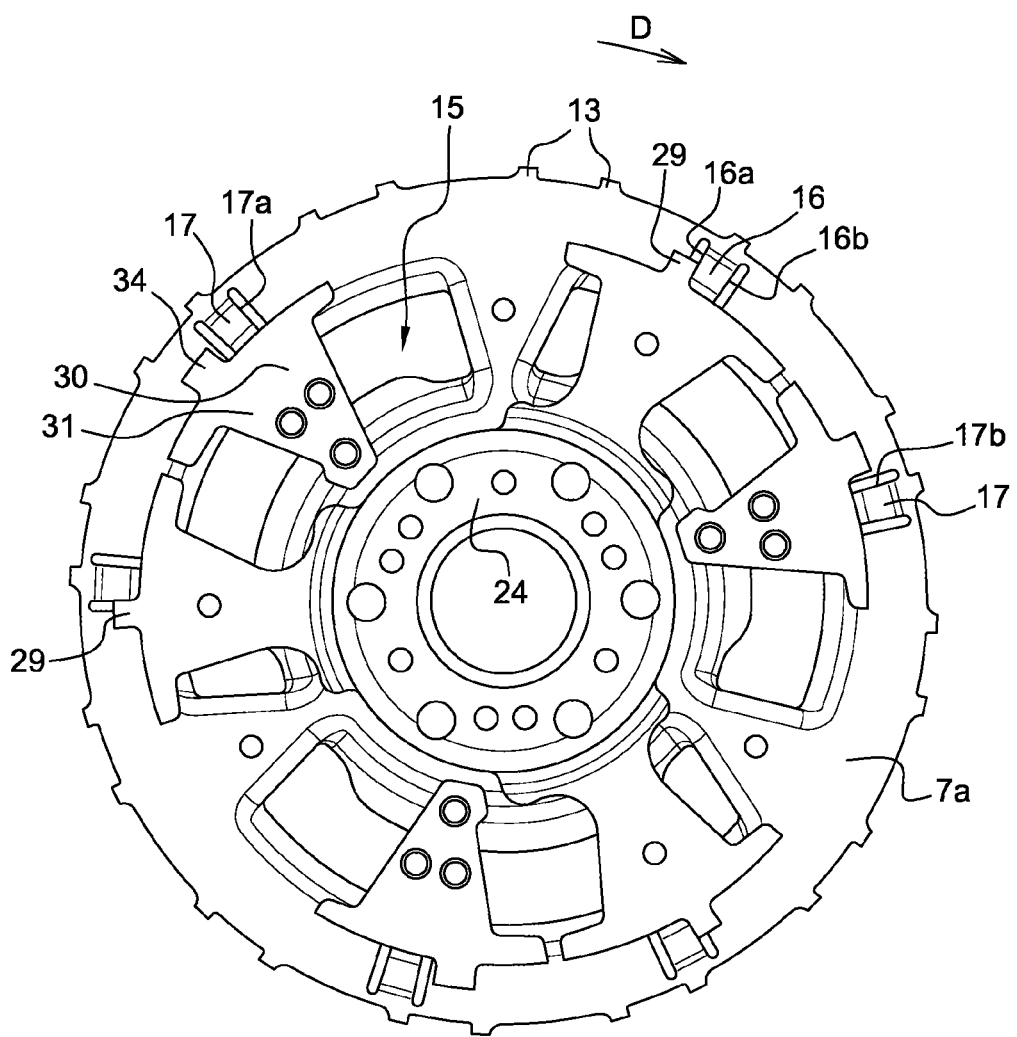
Figure 13:
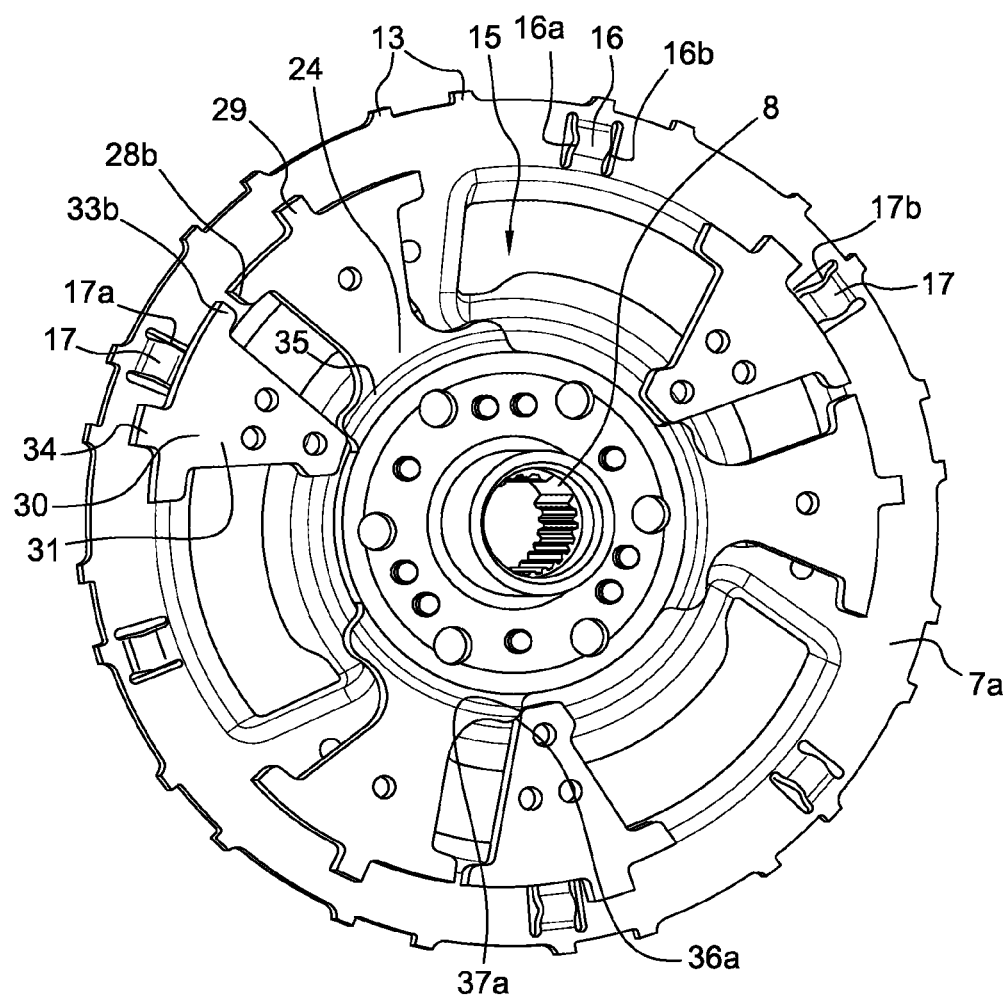
FIG. 13 is a perspective view of a part of the torque transmission device according to a variant embodiment of the invention.

Lastly, FIG. 12 illustrates a fourth operating instance in which annular web 24 has pivoted in the forward direction (arrow D) from its inactive position illustrated in FIG. 9, said pivoting being limited by the fact that blocks 29 come to a stop against faces 16a of projecting elements 16.

Figure 14:
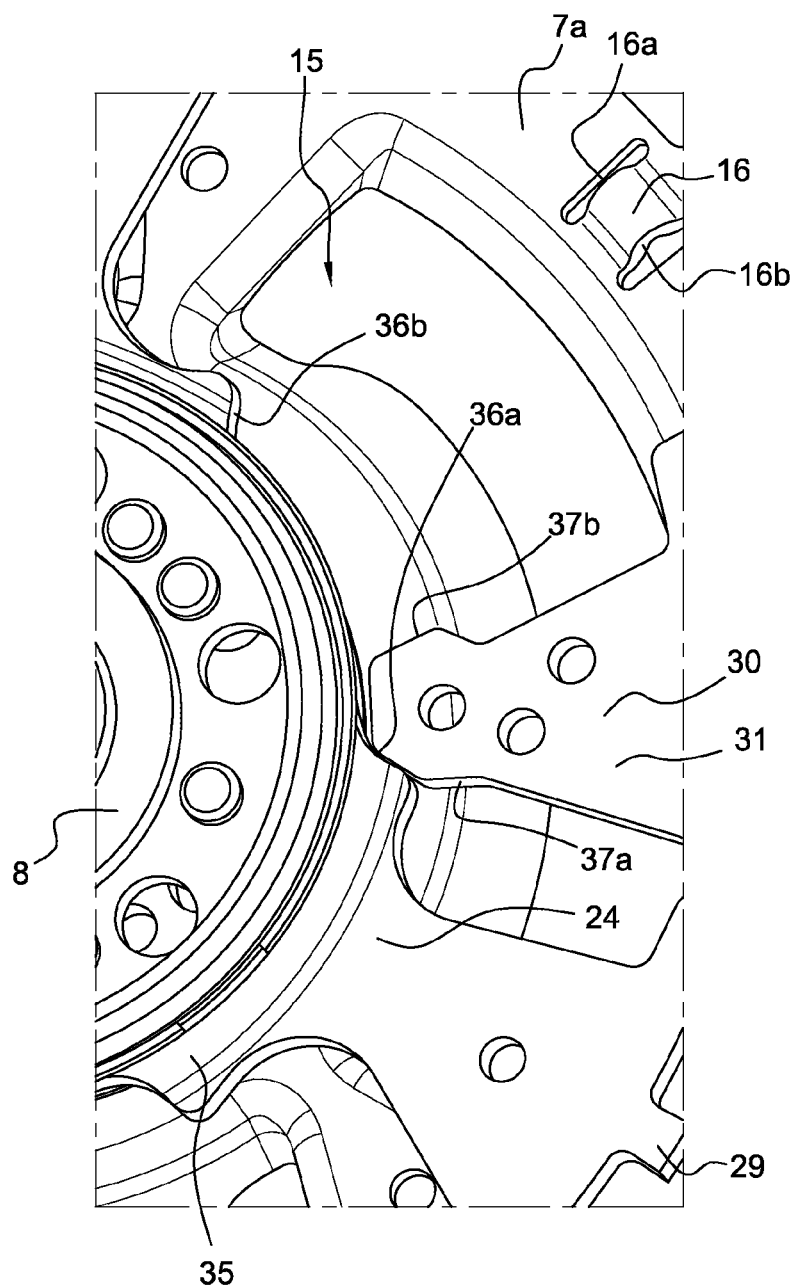
FIG. 14 is a detail view of the device of FIG. 13.
Figure 15:
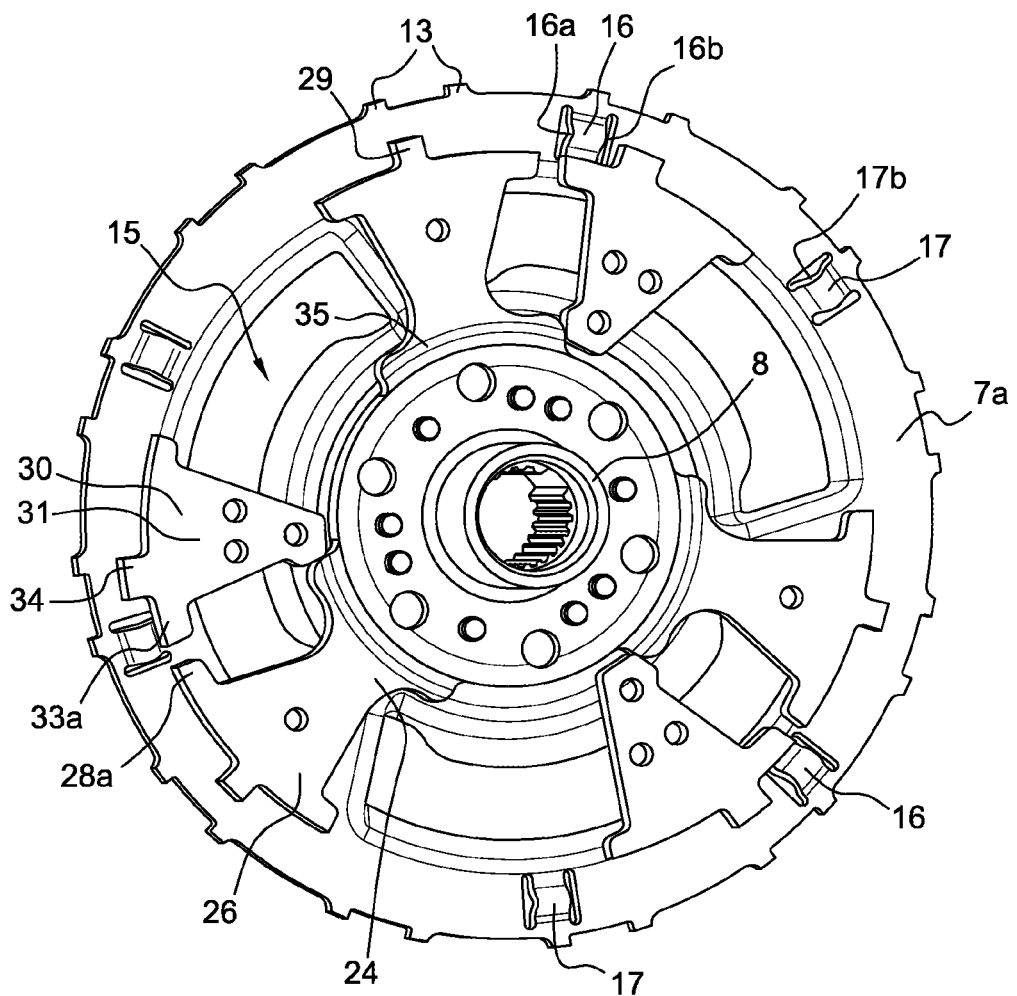
FIGS. 15 and 16 are views corresponding respectively to FIGS. 13 and 14, with the phasing member in another position with respect to the annular web.
Figure 16:
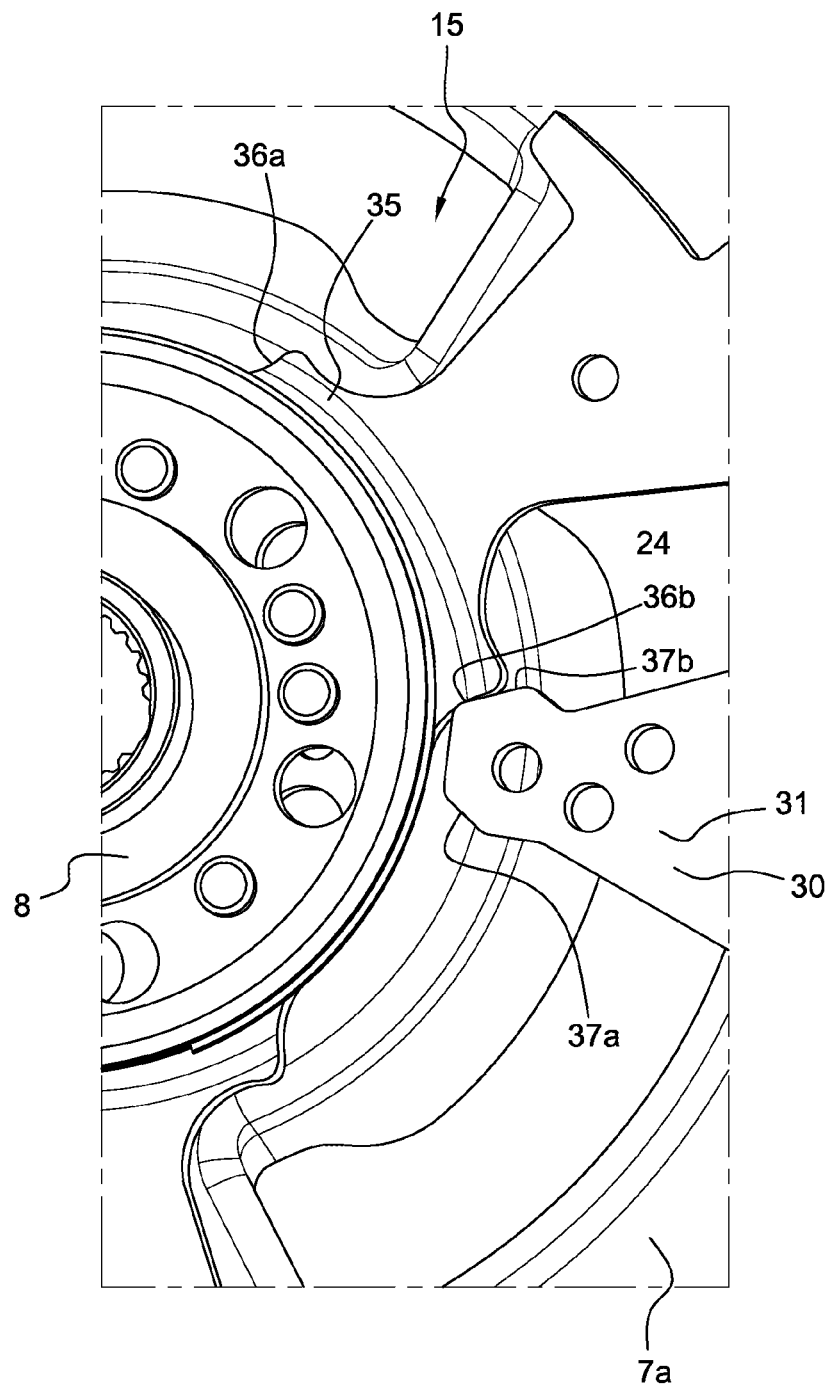

FIGS. 13 to 16 illustrate a variant embodiment in which tabs 26 of annular web 24 have a widened base 35 situated radially inwardly and having two opposite abutment surfaces 36a, 36b (FIGS. 14 and 16). Depending on the rotation direction of phasing member 30 with respect to annular web 24, abutment members 31 can come to a stop at their inner periphery (FIGS. 13 and 14) either against abutment faces 36a of bases 35 or against abutment faces 36b of bases 35 (FIGS. 14 and 16).

More particularly, abutment faces 36a, 36b of base 35 can be oblique with respect to the radial direction. Abutment members 31 can likewise have, at their inner periphery, oblique surfaces 37a, 37b (FIGS. 14 and 16) having shapes complementary with those of faces 36a, 36b.

Abutment can occur simultaneously or almost simultaneously at stop blocks 28a, 28b, 33a, 33b and at faces 36a, 36b and 37a, 37b of bases 35 and of stop members 31.

Or, in the preferred embodiment of the invention, abutment can occur only at the aforementioned faces 36a, 36b, 37a, 37b, as depicted in FIG. 15.

The invention thus proposes a torque transmission device, embodied for example as a torque converter or a dual mass flywheel, able to limit the rotation of guide washers 7a, 7b with respect to annular web 24, the rotation of guide washers 7a, 7b with respect to phasing member 30, and the rotation of annular web 24 with respect to phasing member 30.

It is possible to control the angular deflection of each of these elements depending on the positions of the various stops, in particular in order to limit the compression of and prevent damage to elastic members 10a, 10b mounted between guide washers 7a, 7b and phasing member 30 on the one hand, and between phasing member 30 and annular web 24 on the other hand.

The invention claimed is:
1. A torque transmission device for a motor vehicle, having a
   torque input element formed by a pair of guide washers (7a, 7b),
   a torque output element in the form of an annular web (24), said pair of guide washers extending radially on either side of the annular web, and said pair of guide washers and annular web being movable rotationally respectively, and
   at least one group of elastic members (10a, 10b) mounted between the torque input element (7a, 7b) and the torque output element (24) and acting against the rotation of the torque input element (7a, 7b) and the torque output element (24) with respect to one another, the elastic elements (10a, 10b) of said group being arranged in series by means of a phasing member (30) so that the elastic members (10a, 10b) of each group deform in phase with one another, and,
   the torque output element (24) and the phasing member (30) having first (28a, 33a) and second stop means (28b, 33b) limiting their relative rotation in two opposite rotation directions (D, R), and,
   the torque input element (7a, 7b) and the phasing member (30) having third (34, 17b) and fourth stop means (34, 16b) limiting their relative rotation in two opposite rotation directions (D, R), and
   wherein the torque input element (7a, 7b) and the torque output element (24) have fifth (29, 16a) and sixth stop means (29, 17a) limiting their relative rotation in two opposite rotation directions (D, R), and
   wherein the elastic members (10a, 10b) of the group or of each group come into abutment on the one hand against the torque output element, and on the other hand against the torque input element, wherein the annular web (24) and the phasing member (30) each have regions (26, 31) extending radially and serving for abutment of the elastic members (10a, 10b), stop blocks (28a, 28b, 33a, 33b) extending circumferentially on either side of each of said regions (26, 31) so that the stop blocks (28a, 28b) of the annular web (24) are able to come into abutment against the stop blocks (33a, 33b) of the phasing member (30).

2. The device according to claim 1, wherein the elastic members (10a, 10b) are helical compression springs, said stop means being designed to limit compression of the springs (10a, 10b) and to prevent the turns of the springs from being contiguous upon compression thereof.

3. The device according to claim 1, wherein the annular web (24) has N stop means (29), the phasing member (30) has N stop means (34), and at least one of the guide washers (7a, 7b) has 2N projecting elements (16, 17) intended to interact during operation with the N stop means (29, 34) of the annular web (24) and of the phasing member (30), each projecting element (16, 17) having two opposite stop faces (16a, 16b, 17a, 17b), the projecting elements (16, 17) being distributed over the circumference of the guide washer (7a) in two groups, the stop means (29) of the annular web (24) being able to come into abutment against first faces (16a) of the projecting elements (16) of a first group in a first rotation direction (D), and against first faces (17a) of the projecting elements (17) of a second group in a second, opposite rotation direction (R), the stop means (34) of the phasing member (30) being able to come into abutment against second faces (17b) of the projecting elements (17) of the second group in a first rotation direction (D), and against second faces (16b) of the projecting elements (16) of the first group in a second, opposite rotation direction (R).

4. The device according to claim 3, wherein the stop means of the annular web (24) and of the phasing member (30) interacting with the projecting elements (16, 17) of the guide washer (7a) have blocks (29, 34) extending from the abutment regions (26, 31) of the elastic members (10a, 10b), each block (29, 34) having two opposite stop faces able to come into abutment against the corresponding stop faces (16a, 16b, 17a, 17b) of the projecting elements (16, 17) of the two groups.

5. The device according to one of claim 3, wherein the annular web (24) has a radially inner annular part (25) from which abutment tabs (26) of the elastic members (10a, 10b) extend radially outward.

6. The device according to one of claim 1, wherein the annular web (24) has a radially inner annular part (25) from which abutment tabs (26) of the elastic members (10a, 10b) extend radially outward.

7. The device according to claim 1, wherein the annular web (24) and the phasing member (30) each have regions (26, 31) extending radially and serving for abutment of the elastic members (10a, 10b), able to come to a stop against one another at their inner periphery, upon rotation of the phasing member (30) with respect to the annular web (24).

8. The device according to claim 1, wherein said two guide washers (7*a*, 7*b*) are fastened to one another by riveting and/or by welding at their radially outer periphery.

9. The device according to claim 1, wherein at least one (7*b*) of the guide washers (7*a*, 7*b*) has, on its radially outer periphery, deformable lugs (14) able to be bent onto the other guide washer (7*a*) so as to ensure fastening of the one to the other.

\* \* \* \* \*